US011125008B2

(12) United States Patent
Hay, III (10) Patent No.: US 11,125,008 B2
(45) Date of Patent: Sep. 21, 2021

(54) WINDOW PANEL INSTALLATION SYSTEM FOR PROTECTION AGAINST STRONG WINDS

(71) Applicant: Hawkes Design and Consulting, LLC, Charleston, SC (US)

(72) Inventor: Henry M. Hay, III, Charleston, SC (US)

(73) Assignee: HAWKES DESIGN AND CONSULTING, LLC, Charleston, SC (US)

(*) Notice: Subject to any disclaimer, the term of this patent is extended or adjusted under 35 U.S.C. 154(b) by 208 days.

(21) Appl. No.: 16/242,392

(22) Filed: Jan. 8, 2019

(65) Prior Publication Data

US 2019/0211620 A1 Jul. 11, 2019

Related U.S. Application Data

(60) Provisional application No. 62/614,687, filed on Jan. 8, 2018.

(51) Int. Cl.
| | |
|---|---|
| *E06B 9/02* | (2006.01) |
| *E06B 9/52* | (2006.01) |
| *E06B 9/06* | (2006.01) |
| *E06B 9/00* | (2006.01) |
| *F16B 5/06* | (2006.01) |

(52) U.S. Cl.
CPC ............... *E06B 9/02* (2013.01); *E06B 9/52* (2013.01); *E06B 9/0692* (2013.01); *E06B 2009/005* (2013.01); *E06B 2009/524* (2013.01); *E06B 2009/527* (2013.01); *F16B 5/0692* (2013.01)

(58) Field of Classification Search
CPC .... E06B 9/02; E06B 2009/005; E06B 9/0692; E06B 9/52; E06B 2009/527; E06B 3/28; F16B 5/0692
See application file for complete search history.

(56) References Cited

U.S. PATENT DOCUMENTS

| | | | |
|---|---|---|---|
| 1,741,958 A * | 12/1929 | Shogren | E06B 9/52 160/397 |
| 3,939,620 A * | 2/1976 | Bero | E05D 1/02 52/717.05 |
| 4,544,012 A * | 10/1985 | Woodward | E06B 3/28 160/90 |

(Continued)

*Primary Examiner* — Daniel P Cahn
*Assistant Examiner* — Abe Massad
(74) *Attorney, Agent, or Firm* — Michael A. Mann; Bryan L. Baysinger; Nexsen Pruet, LLC (57) ABSTRACT

A temporary panel and panel system. The panel system comprises a fabric held in a two-part, snap-together connector system. The connector system is attachable to a window connector system to secure it temporarily until fasteners can be driven into the panel system and the channel of the window frame. The window connector includes a fastener boss that helps to hold the fasteners that hold the panel to the window frame. The fabric of the panel system is made of a geotextile. The marginal edge of the geotextile may be coated with urethane adhesive before being inserted between the two parts of the connector system. Placement of fasteners along the perimeter of the connector system is guided by a centering groove in the connector system that positions the fastener over a fastener boss in the window frame. The panel system, help temporarily in place to the window frame, may then be securely attached by fasteners driven into the connector system.

18 Claims, 9 Drawing Sheets

(56) References Cited

U.S. PATENT DOCUMENTS

| | | | | |
|---|---|---|---|---|
| 4,561,223 | A * | 12/1985 | Gold | E06B 3/28 |
| | | | | 49/478.1 |
| 5,141,046 | A * | 8/1992 | Duncan | E06B 9/52 |
| | | | | 160/371 |
| 5,301,737 | A * | 4/1994 | Martin | E06B 9/52 |
| | | | | 160/380 |
| 5,371,925 | A * | 12/1994 | Sawatsky | B65D 33/004 |
| | | | | 24/30.5 R |
| 5,553,422 | A * | 9/1996 | Gazaway | E06B 5/10 |
| | | | | 52/204.53 |
| 5,603,190 | A | 2/1997 | Sanford | |
| 5,906,078 | A * | 5/1999 | Cramer | E04H 15/646 |
| | | | | 135/121 |
| 6,263,949 | B1 * | 7/2001 | Guthrie, Jr. | E06B 3/5807 |
| | | | | 160/371 |
| 6,289,642 | B1 | 9/2001 | Diamond | |
| 6,314,689 | B1 | 11/2001 | Hughes | |
| 6,502,355 | B1 | 1/2003 | Bori | |
| 6,705,054 | B2 | 3/2004 | Pelton | |
| 6,886,300 | B2 * | 5/2005 | Hudoba | E06B 9/02 |
| | | | | 135/115 |
| 6,898,907 | B2 | 5/2005 | Diamond | |
| 8,863,452 | B1 * | 10/2014 | Hay, III | E06B 9/02 |
| | | | | 52/202 |
| 2010/0146881 | A1 | 6/2010 | Framer et al. | |
| 2012/0073771 | A1 * | 3/2012 | Dickison | E06B 9/52 |
| | | | | 160/395 |
| 2014/0130993 | A1 * | 5/2014 | Zwar | E06B 5/00 |
| | | | | 160/371 |
| 2016/0160492 | A1 * | 6/2016 | Gower | E04B 1/40 |
| | | | | 52/202 |
| 2016/0273263 | A1 * | 9/2016 | Farina | E06B 3/58 |

* cited by examiner

WINDOW PANEL INSTALLATION SYSTEM FOR PROTECTION AGAINST STRONG WINDS

TECHNOLOGY FIELD

This specification relates to temporary coverings for windows to protect them from damage caused by strong winds.

BACKGROUND

Storms are characterized by strong winds. Strong winds apply pressure to windows of a building and also blow dirt, sand, and debris at the windows. Windows may become damaged or broken as a result. Moreover, if a window of a building breaks from strong winds, the sudden pressure change inside the building may cause damage to interior property and structures.

Temporary coverings for protecting windows during a storm are well-known. See for example Sanford (U.S. Pat. No. 5,603,190), Pelton (U.S. Pat. No. 6,705,054), Framer (US patent Publication 2010/0146881), Diamond (U.S. Pat. Nos. 6,289,642 and 6,898,907), Bori (U.S. Pat. No. 6,502,355), and Hughes (U.S. Pat. No. 6,314,689).

However, there remains a need for an effective window panel installation system that may be installed temporarily, quickly, safely, and securely, and that provides protection for a window against strong winds.

SUMMARY

According to its major aspects and briefly recited, herein is disclosed a window panel installation system. The present window panel installation system comprises a connector, a panel held by the connector, and fasteners. The window panel installation system may also contain window trim for use in securing the connector to the window frame.

The window "storm" trim may include an integral screw boss for receiving and holding fasteners that secure the connector which in turn holds the edge of the panel. The fasteners may be screws, ideally screws with washers that may rotate freely about the screw shaft and remain with the screw. The window trim traps the marginal edge of the panel between a first part and a second part of the connector that then snap together for a secure hold of the panel. The panel may be a fabric, such as a geotextile, or a sheet of plastic.

Fasteners along the perimeter of the window connector may be spaced as convenient. Satisfactory lateral placement of the fasteners along the periphery of the window connector is guided by a centering groove in the connector system that assists the user in locating the entry points on the connector system for inserting the fasteners. Moreover, the fabric panel snaps into place on the window connector so it is held in place frictionally. The person installing the fabric panel does not need to hold the fabric panel in place with one hand while simultaneously driving fasteners into the connector for their more secure attachment of the fabric panel to the window frame. Fasteners are used to provide extra security of the fabric panel to the window during high winds.

DETAILED DESCRIPTION

Figure 1:
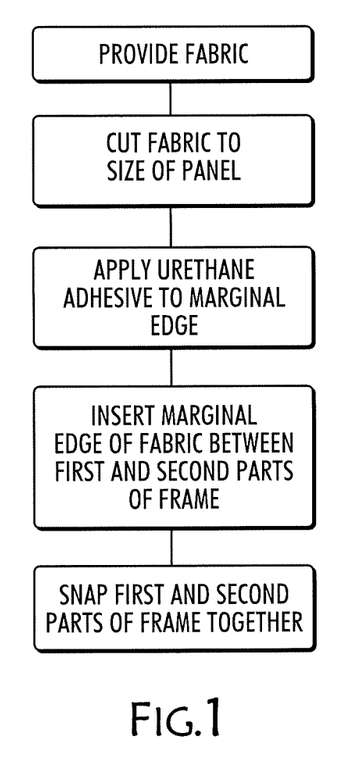
FIG. 1 is a flow diagram of a method of making a protective panel for covering a window, according to a first aspect of the disclosure.
Figure 2:
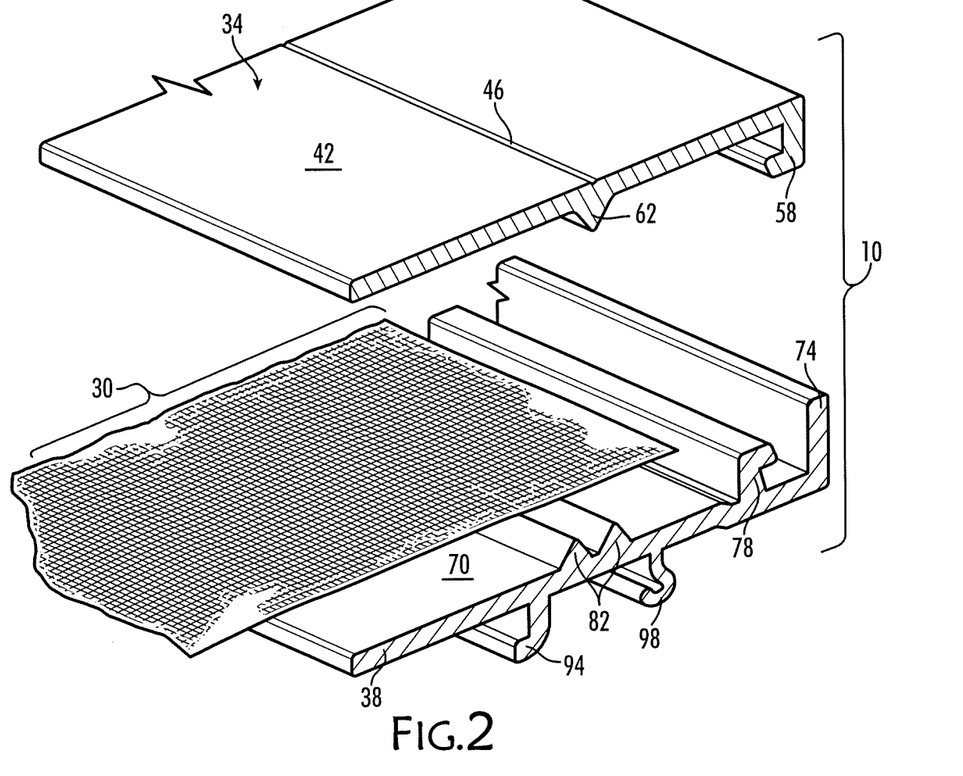
FIG. 2 is an exploded, perspective, cross-sectional view of a two-part connector system and fabric that, together, form the fabric panel, according to the first aspect of the disclosure.
Figure 3:
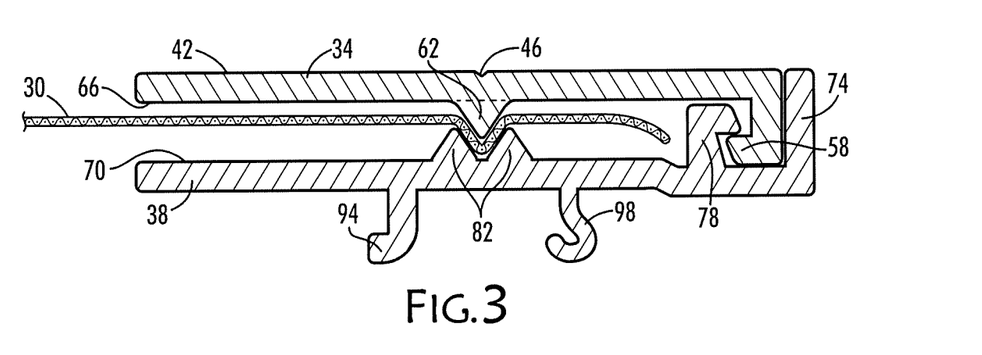
FIG. 3 is an assembled, cross-sectional view of the fabric panel, according to the first aspect of the disclosure.
Figure 4:
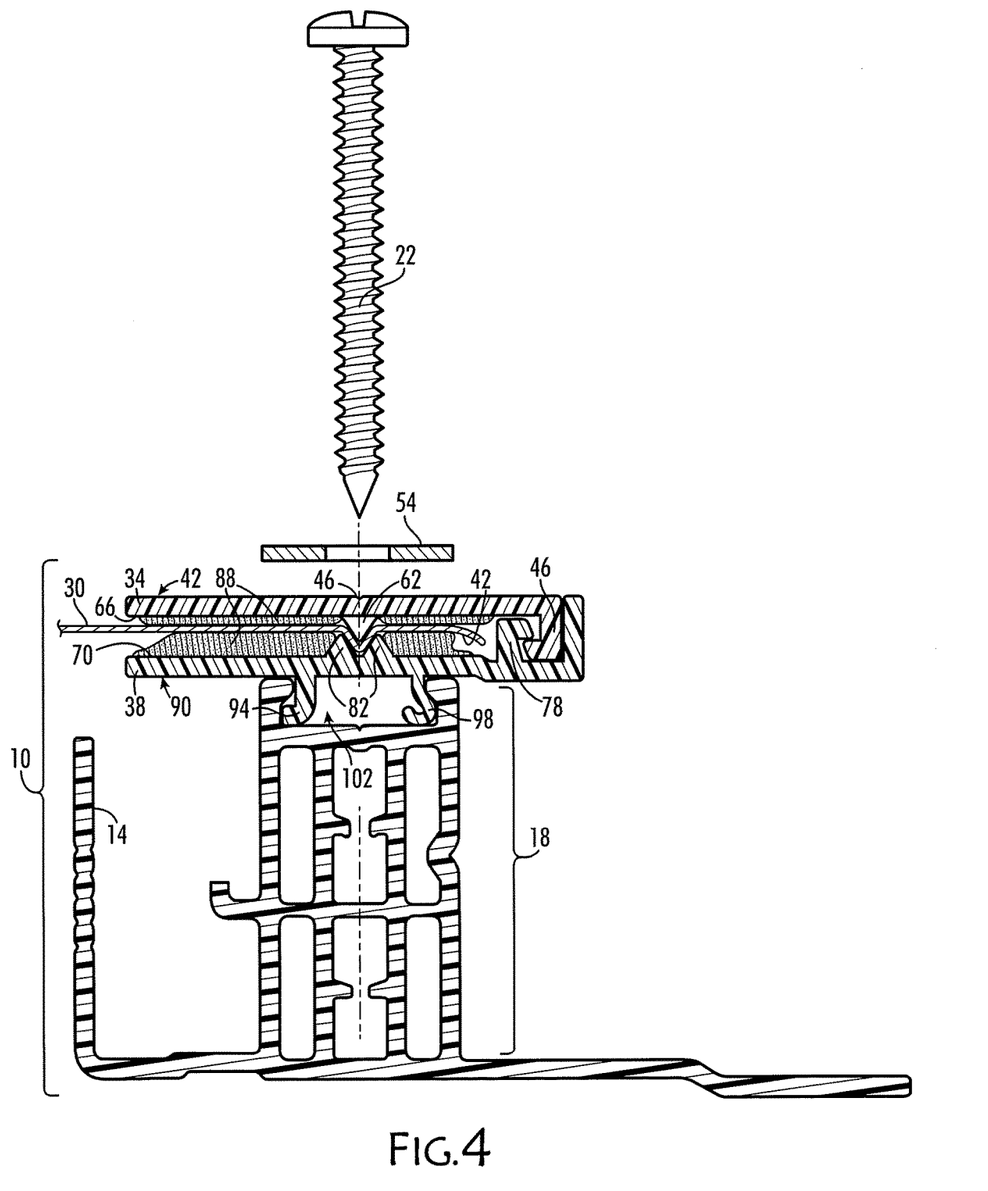
FIG. 4 is a cross-sectional, partially-exploded, end view of the fabric panel of FIG. 3 temporarily secured to a window connector a with fastener boss and using a fastener and washer, the fastener shown poised at the centering groove of the two-part connector system, according to the first aspect of the disclosure.

Referring first to FIGS. 1-4, herein is disclosed a fabric panel 10 that, in cooperation with a window connector 14, provides a window protection system against storm winds. Window connector 14 is shown in FIGS. 2-4 with structural elements such as studs, siding, bricks and the like removed so that window connector 14 can be seen more easily. The specific shape of window connector 14 may vary depending on the wall structure and materials to which it is attached. When window connector 14 includes a fastener boss 18, the fabric panel may be snapped into position using the window connector 14 to hold it temporarily in place. Fasteners 50 may then be used to attach fabric panel 10 more securely. Importantly, fabric panel 10 does not need to be held in place by the person installing it onto a window while simultaneously attempting to drive fasteners 50 into fabric panel 10.

Referring now to FIGS. 1-4, there is described the method for making fabric panel 10 and shown the components of fabric panel 10.

Fabric panel 10 includes a connector system 26 and a fabric 30. Fabric 30 is an aspect of the disclosure. Fabric 30 may be made of a "geo-fabric", such as polypropylene fibers or polyester fibers that are woven, needle-punched, or heat-bonded. Geo-fabrics are strong, water-permeable, and, in this application, well-suited to provide protection for window glazing. Fabric 30 is provided and cut to the size to cover the window for which it is to be used. Fabric 30 may conveniently be cut by using a laser-cutting tool or a heated knife or blade.

Connector system 26 includes a first part 34 and a second part 38. First part 34 has a generally flat top surface 42 with a centering groove 46 that runs the length of first part and assists in the installation of fabric panel 10 to window connector 14 that has a fastener boss 18 by enabling the user to line up the fabric panel with the fastener boss 18 so that a fastener 50 may be driven through fabric panel 10 into fastener boss 18. A fastener boss 18 is disclosed and defined in U.S. Pat. No. 8,863,452, which is incorporated herein in its entirety by reference.

Plural fasteners 50 with washers 54, will line up around the periphery of fabric panel 10. A fastener 50 seats in fastener boss 18. The linear spacing between fasteners 50 may vary and centering groove 46 helps to assure that each fastener 50 is driven laterally into fastener boss 18. Fastener boss 18 provides holding power for each fastener 50 and for fabric panel 10 that is held to window connector 14 by that fastener 50.

First part 34 of fabric panel 10 includes a depending connection 58 and a projection 62 on its bottom surface 66. Second part 38 of fabric panel 10 has a top surface 70 formed to receive depending connection 58. Depending connection 58 of first part 34 is receivable between end wall 74 and locking flange 78 so that first part 34 is held securely to second part 38. In addition, projection 62 on bottom surface 66 of first portion fits between two teeth 82 on top surface 70 of second part 38.

Fabric 30, when cut for the particular window it is to cover, has a marginal edge 86 along its periphery that is inserted between first part 34 and second part 38 to form fabric panel 10. Projection 72 and teeth 82 help to hold marginal edge 86 in place between them. The strength of the hold may be augmented by applying an adhesive bead 88, such as a urethane adhesive, to at least one side of marginal edge 86 before fabric 30 is inserted between first part 34 and second part 38.

The application of a bead of urethane adhesive 88 to the marginal edge 86 of fabric 30 may be done conveniently using a "caulk" gun, for example. Adhesive bead 88 may be cured by the passage of time or by application of heat and a catalyst, according to the instructions provided by the manufacturer of the urethane adhesive.

Second part 38 has a bottom surface 90 on which is formed a first hook 94 and a spaced-apart second hook 98. First hook 94 and second hook 98 may be curved on their respective ends, as shown in FIG. 4, to better engage the top opening 102 of fastener boss 18. First hook 94 and second hook 98, when joined to fastener boss 18. position centering groove 46 so that fastener 50, when driven through first part 34 and second part 38 at centering groove 46, will pass into and through fastener boss 50.

First hook 94 and second hook 98 may be curved in the same direction to be opposing so that they can be rotated into position when fabric panel 10 is snapped onto window connector 14 and out of position when fabric panel 10 is removed from window connector 14.

Figure 5:
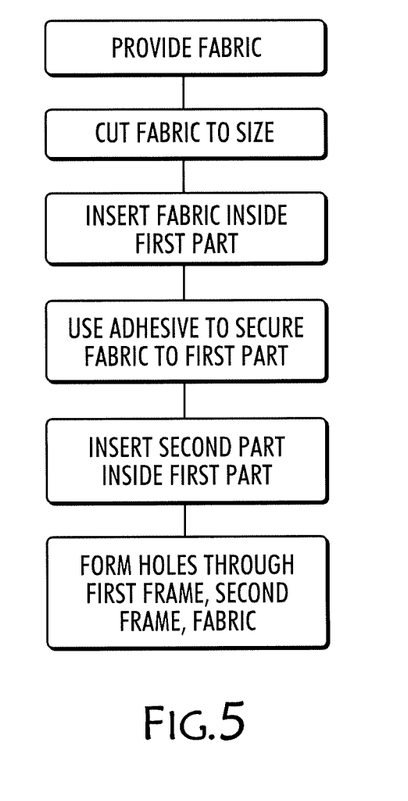
FIG. 5 is a flow diagram of a an alternative method of making a protective fabric panel for covering a window, according to a second aspect of the disclosure.
Figure 6:
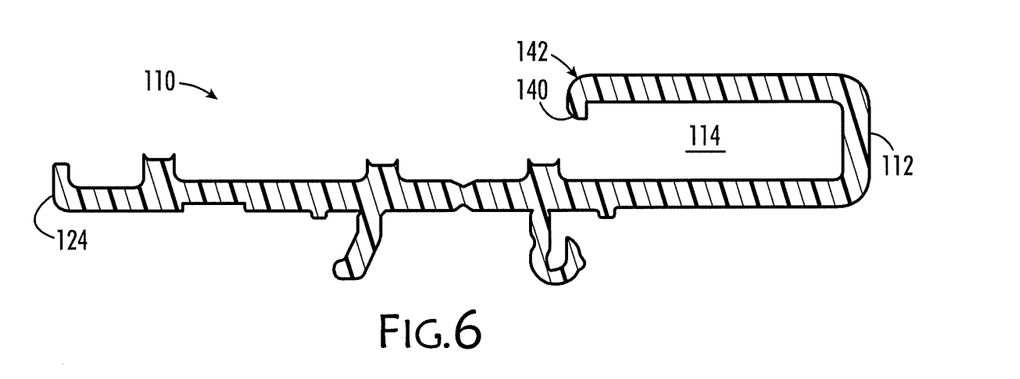
FIGS. 6 and 7 are cross-sectional end views of a first part and a second part, respectively, of a two-part connector system for a fabric panel, according to the second aspect of the disclosure.
Figure 7:
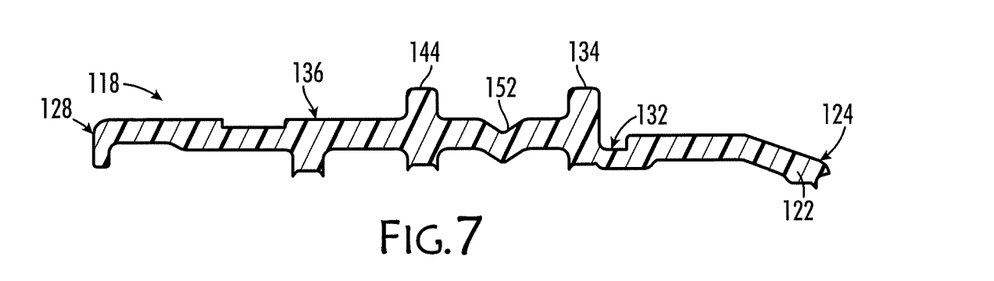
Figure 8:
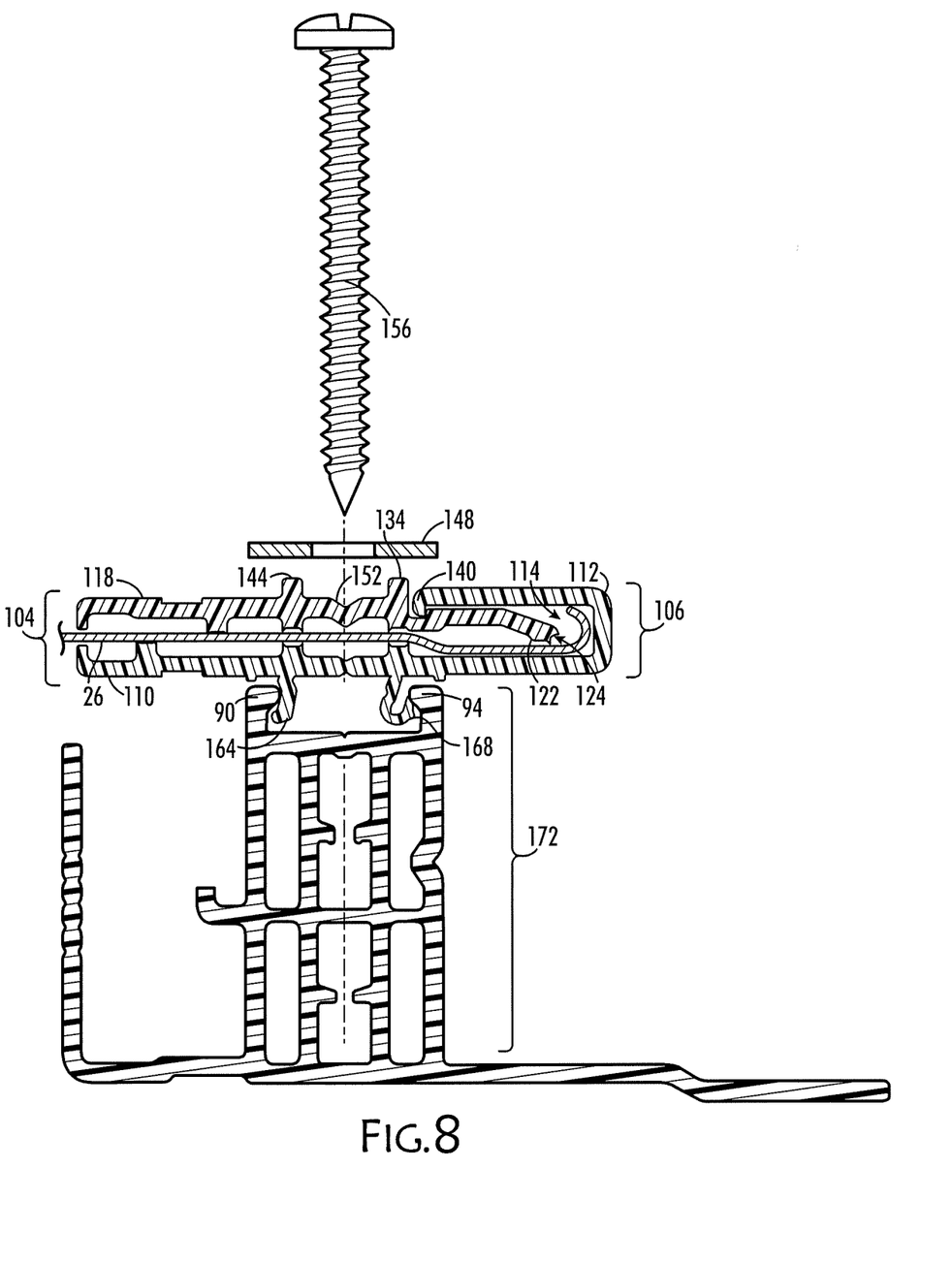
FIG. 8 is a cross-sectional, partially-exploded, side view of a fabric panel being temporarily attached to a window connector, the window connector having a fastener boss, and which fabric panel is to be attached, using a washer and a fastener, at the centering groove of the first part of the two-part connector system to the window connector, according to the second aspect of the disclosure.

FIG. 5 shows the method for making a panel according to a second aspect of the present panel; FIGS. 6, 7, and 8 show first part 110 and second part 118 of connector system 106, made according to the method of FIG. 5.

Fabric 30 is provided and cut to size for fabric panel 106. In this second aspect, a fabric panel 106 also has two parts. A first part 110 of fabric panel 106 is formed to have a curve 112, thereby creating a channel 114 in which marginal edge 86 of fabric 30 can be received. A second part 118 of fabric panel 106 has a limiter 122 at a first end 124 to limit the depth to which second part 118 is insertable into channel 114 of first part 110.

A locking groove 132 is formed in second part 118 of fabric panel 106. Locking groove 132 is defined by a first ridge 134 on a top surface 136. Locking groove 132 receives a lip 140 at first end 142 of first part 110. Locking groove 132, by capturing lip 140, limits relative lateral movement of first part 110 with respect to second part 118, after second part 118 has been inserted into first part 110. Second part 118 is thus held inside curve 112 of first part 110.

A second ridge 144 is carried by second part 118 and spaced apart from first ridge 134 to provide resilient support for a washer 148. Between first ridge 134 and second ridge 144 is a centering groove 152 that serves to indicate to the user where a fastener 156 is to be started when attaching panel 104 to a window connector 14.

On bottom surface 160 of first portion is a first hook 164 and a second hook 168. First hook 164 and second hook 168 engage a fastener boss 172, which serves to hold first part 110 and second part 118 to fabric panel 106 and also to center centering groove 152 with respect to fastener boss 172.

Once fabric panel 106 is assembled, holes may be formed in it through fabric panel 106 where fasteners 156 are to be placed to facilitate attachment. Holes may be formed using a punch or by melting them. The holes may be slots, being longer in one dimension than in an orthogonal direction, to simplify attachment of fabric panel 104 to window connector 14.

The present fabric panel 106 avoids folding fabric 30, and the need for having to fold fabric 30 using folding equipment and the attendant costs of folding equipment and time, and increases manufacturing accuracy in producing panel 106. Panel 106 is typically half the weight of similar storm panels and considerable easier and safer for the installer.

Figure 9A:
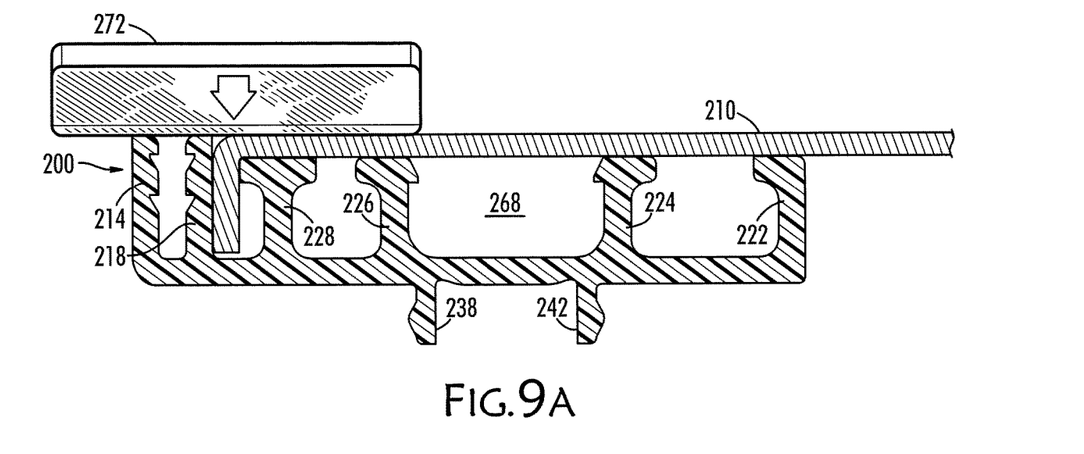
FIGS. 9A, 9B, 9C and 9D represent an alternative aspects of the two-part connector to which a fabric is being attached, wherein a marginal edge of the fabric is held in its initial position in a first part of the connector in FIG. 9A, forced into the first part of connector in FIG. 9B, prepared for receiving the second part of the two-part connector in FIG. 9C, and firmly seated between the first part and second part of two part connector in FIG. 9D.

An alternative aspect of the present connector is shown in the series of figures identified as FIGS. 9A, 9B, 9C and 9D. FIG. 9A a first part 200 of a connector 202 is shown in cross-section with a panel 210 pulled across connector 202 and inserted between the right wall 218 and an interior column 228, wherein it is held in place temporarily during manufacture by a first block 272. Panel 210 may be made of fabric.

Not shown in FIG. 9A are the other three sides of connector 202, which are the other three sides of its rectangular shape. FIG. 9A shows the cross-section of one side of connector 202 when connector is viewed from the right. The left end of connector 202 shown in FIG. 9A is the top of connector or its header. The sill of connector 202 (not shown) would be a mirror image of FIG. 9A. If panel 210 is attached to four sides of connector 202, the two lateral, frames would have the same configurations as the header and sill.

Figure 9B:
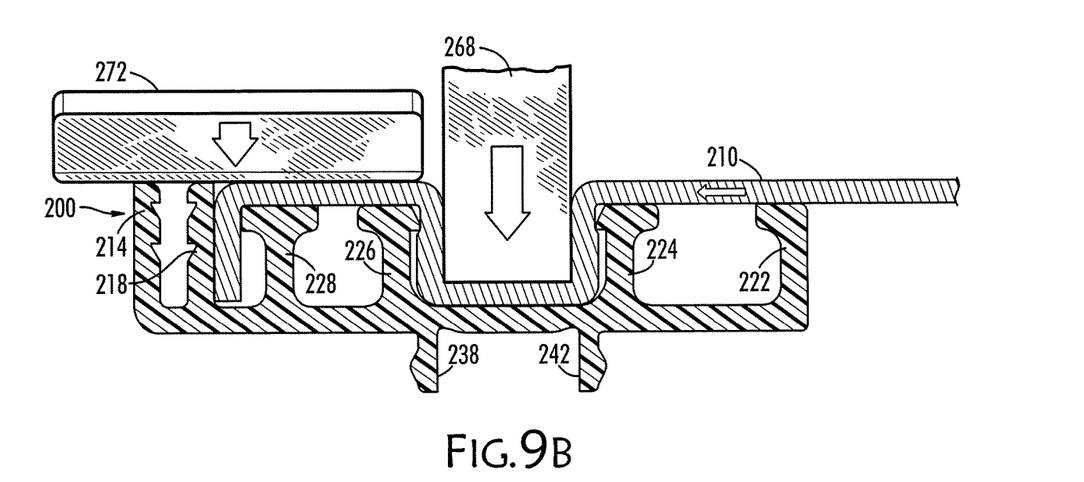

In FIG. 9B, a second block 268 is used to force panel 210 into a space between a right column 224 and a left column 226. Second block 268 pushes panel 210 into the interior of a channel formed in first part 200 between right column 224 and left column 226, conforming to that interior because of the complimentary shapes of second block 268 and the space between right column 224 and left column 226. As panel 210 is forced into that space and conforms to the shape of that space, as first block 272 holds fabric panel 210 in place, panel 210 is pulled to the left in FIG. 9B (see arrow on fabric at right), thereby tightening panel 210 in the interior of the rectangular frame of the window, of which only first part 200 is shown in FIG. 9A.

Figure 9C:
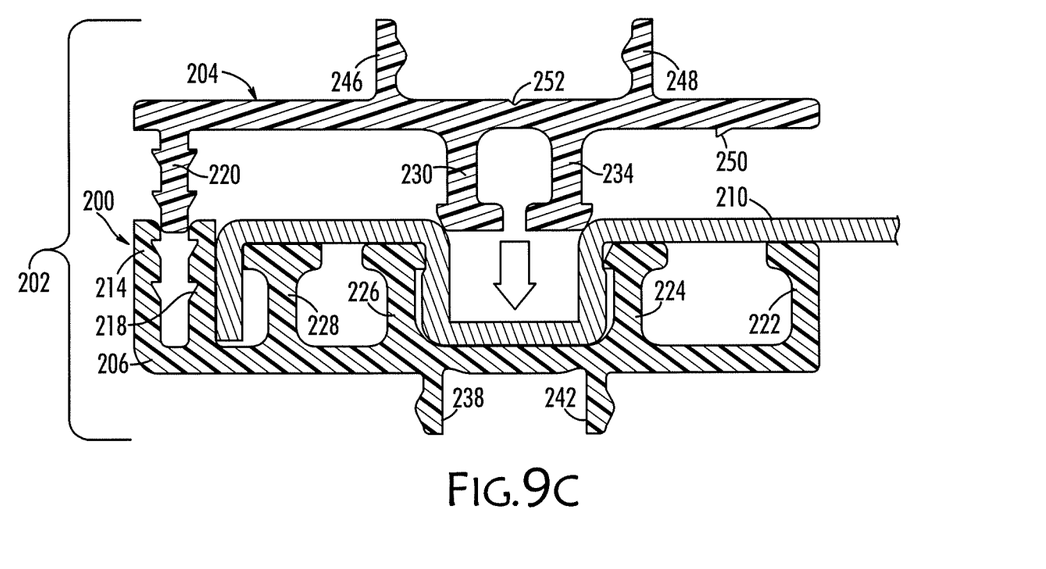
Figure 9D:
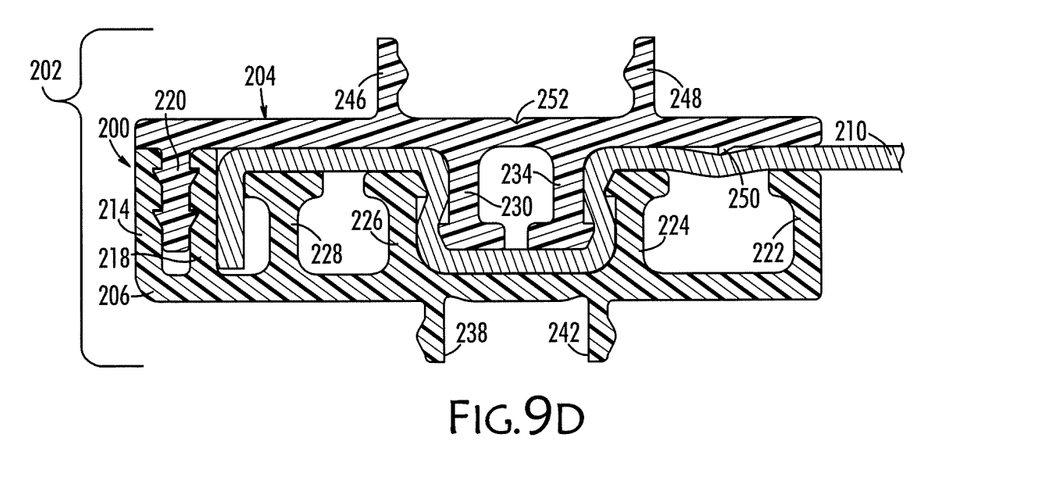

FIG. 9C shows second part 204 of connector 202 in place in registration with first part 200 of connector 202, not seated in first part 200. FIG. 9D shows second part 204 seated in first part 200. A post 220 of second part 204 is positioned between inner wall 218 and an outer wall 214. Inner wall 218, outer wall 214, and post 220, may be formed so as to resist separation from each other once joined, as seen in FIG. 9D, for example, by complimentary structures that provide an interference fit in addition to a frictional fit.

The left end of connector 202 thus remains attached despite varying winds directed at panel 210 during a storm. Also, a left column 230 and a right column of second part 204 will fit between left column 226 and right column 224 of first part 200 with panel 210 in between to augment the hold on panel 210. Left column 230 and right column 234 of second part 204 may be formed so they are cammed toward each other by the curved surface of fabric panel 210 as it negotiates the tops of left column 226 and right column 224 of first part and seats in first part 200. The resiliency of left column 230 and right column 234 cause them to want to spread laterally after being compressed inwardly when first part 200 joins second part 204. The shapes of left column 230 and right column 234 and their counter-part columns, namely, left column 226 and right column 224, resist dislodging of panel 210.

Figure 10:
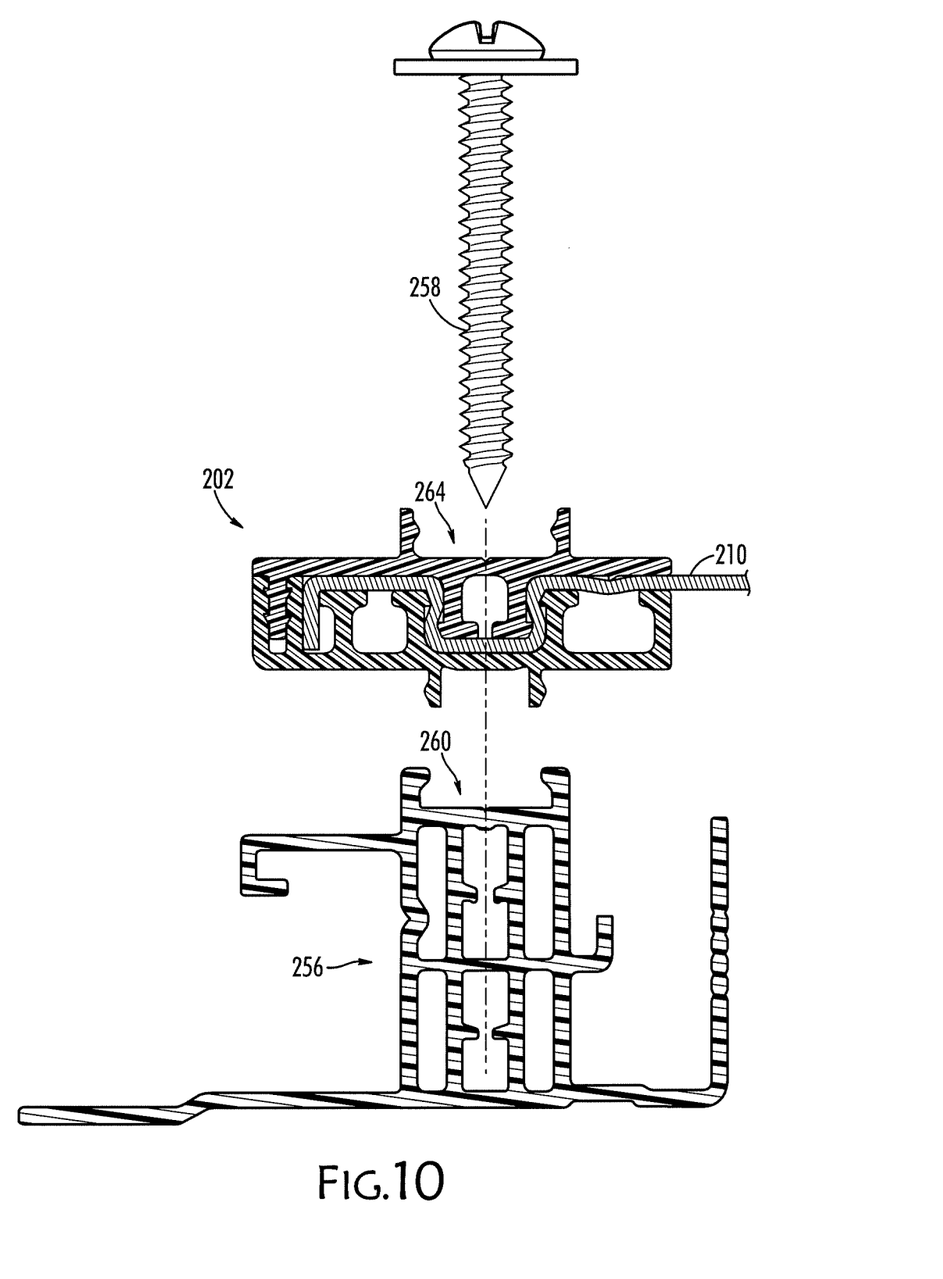
FIG. 10 shows the connector of FIG. 9D in an exploded view with a screw above it positioned for insertion through the two-part connector and into the screw boss portion of a linear profile in preparation for a storm.

FIG. 10 shows connector 202 of FIG. 9D in an exploded view including a screw 258 and a lineal profile 256 of window framing. Screw 258, when seated, in lineal profile 256 so that screw 258 passes through connector 202 and entering a screw boss 260 will hold panel 210 to a window frame.

Those skilled in the art of windows and window protections especially during storms and other high wind events will appreciate that many modifications and substitutions may be made to the aspects described without departing from the spirit and scope of the disclosure.

What is claimed is:

1. A window panel installation system, comprising:
   (a) a panel having a marginal edge;
   (b) the panel formed in part by a connector, comprising:
      a first part and a second part, wherein the first part and the second part are formed to interlock;
      a lip, wherein the lip is formed on the first part, further the lip is formed to lock the first part into the second part;
      a first end, wherein the first end is formed on the second part, the first end receivable in the first part and secured by the lip;
      a first hook, wherein the first hook is formed on a bottom surface of the first part;
      a second hook, wherein the second hook is formed on the bottom surface of the first part, further the first hook and the second hook are configured to open opposite one another;
   (c) fabric, wherein the fabric is secured by the first part and the second part of the connector;
   (d) a screw boss, wherein the screw boss is operatively configured to receive the first hook and the second hook of the first part; and
   (e) a fastener equipped to pierce the fabric and the first part and the second part of the connector, wherein the fastener is configured to extend between the first hook and the second hook to connect to the screw boss, and piercing the first part secures the first hook and the second hook within a channel of the screw boss.

2. The window panel installation system of claim 1, wherein the connector is configured with a centering groove on the second part.

3. The window panel installation system of claim 1 wherein the window panel installation system fastens to a window and wherein the window panel installation system includes trim, the trim being carried by a window frame, and wherein the bottom surface of the first part of the connector carries the first hook and the second hook, the first hook and the second hook being operable to grip the trim.

4. The window panel installation system of claim 1, further comprising a plurality of fasteners equipped to pierce the connector and the fabric, and to be received by the screw boss along a perimeter of the marginal edge.

5. The window panel installation system of claim 4, wherein the plurality of fasteners are screws.

6. The window panel installation system of claim 4, wherein the plurality of fasteners are screws with washers.

7. The window panel installation system of claim 4, wherein the plurality of fasteners are self-tapping screws with washers.

8. The window panel installation system of claim 1, wherein the first part terminates in a U-shape, wherein the U-shape terminates with the lip forming a channel for the second part.

9. The window panel installation system of claim 1, wherein the first part and the second part are configured to interlock by the lip on the first part engaging with a locking groove on the second part, and further held by a first ridge on the second part.

10. The window panel installation system of claim 1, wherein the fabric is a geotextile fabric.

11. The window panel installation system of claim 1, wherein the panel is secured to an exterior surface of a building.

12. The window panel installation system of claim 1, wherein the fabric is flexible.

13. The window panel installation system of claim 1, wherein the fabric is made of polypropylene fibers.

14. The window panel installation system of claim 1, wherein the fabric is made of polyester fibers.

15. The window panel installation system of claim 1, wherein the fabric is woven, needle punched, or heat bonded.

16. The window panel installation system of claim 1, further comprising a bead of adhesive between the fabric and at least one of the first part of the connector and the second part of the connector.

17. The window panel installation system of claim 1, wherein the connector has holes formed therein through the first part and the second part and through the marginal edge of the panel for fasteners.

18. The window panel installation system of claim 17, wherein the holes through the first part and the second part of the connector are formed by thermally melting the connector.

* * * * *